(12) United States Patent
Perrucci

(10) Patent No.: US 9,107,392 B2
(45) Date of Patent: Aug. 18, 2015

(54) LEASH DETANGLE APPARATUS AND METHODS OF USE

(71) Applicant: Levino Perrucci, Lawrenceville, GA (US)

(72) Inventor: Levino Perrucci, Lawrenceville, GA (US)

(*) Notice: Subject to any disclaimer, the term of this patent is extended or adjusted under 35 U.S.C. 154(b) by 107 days.

(21) Appl. No.: 14/086,412

(22) Filed: Nov. 21, 2013

(65) Prior Publication Data

US 2015/0136041 A1    May 21, 2015

(51) Int. Cl.
*A01K 27/00* (2006.01)

(52) U.S. Cl.
CPC .............. *A01K 27/003* (2013.01); *A01K 27/00* (2013.01); *A01K 27/001* (2013.01)

(58) Field of Classification Search
CPC .. A01K 27/001; A01K 27/003; A01K 27/005
USPC ......... 119/792, 793, 795, 799, 856, 858, 787; 54/71
See application file for complete search history.

(56) References Cited

U.S. PATENT DOCUMENTS

| | | |
|---|---|---|
| 5,291,856 A | 3/1994 | Goller |
| 5,842,446 A * | 12/1998 | Scott .............................. 119/856 |
| 6,006,699 A | 12/1999 | Keever |
| 6,095,094 A * | 8/2000 | Phillips .......................... 119/792 |
| 6,453,851 B1 | 9/2002 | Holt, Jr. et al. |
| 6,688,259 B2 * | 2/2004 | Axel .............................. 119/792 |
| 6,837,188 B1 | 1/2005 | Martin |
| 7,004,114 B2 | 2/2006 | Hippensteel |
| 7,013,840 B2 | 3/2006 | Leon |
| 8,171,892 B1 | 5/2012 | Horgan |
| 8,544,420 B2 | 10/2013 | Leon |
| 2003/0066494 A1 | 4/2003 | Hippensteel |
| 2008/0098965 A1 * | 5/2008 | Hachigian ..................... 119/792 |
| 2008/0134989 A1 * | 6/2008 | Weiss ............................ 119/793 |
| 2012/0304942 A1 * | 12/2012 | Louro ............................ 119/792 |
| 2015/0090196 A1 * | 4/2015 | Fleming et al. ............... 119/795 |

OTHER PUBLICATIONS

International Search Authority, "International Search Report," PCT/US14/57643, mailed Jan. 5, 2015.

* cited by examiner

*Primary Examiner* — Trinh Nguyen
(74) *Attorney, Agent, or Firm* — Mathew L. Grell; Balser & Grell IP Law, LLC

(57) ABSTRACT

A curved strip having a slot on one end configured to receive a ring from an animal collar, the strip having an aperture positioned proximate an opposite end, the aperture configured to receive an animal leash and clasp, wherein the clasp is affixed to the ring positioned through the slot and, thus, functions to enable the leash detangle apparatus to affix the leash and animal collar and maintain the leash in a position not between the animal's feet.

23 Claims, 6 Drawing Sheets

LEASH DETANGLE APPARATUS AND METHODS OF USE

TECHNICAL FIELD

This disclosure relates generally to leashes and tethers for animals, and specifically to leashes and tethers which are resistant to sagging and tangling about an animal's legs.

BACKGROUND

Dog leashes and tethers are utilized with dog collars to walk a dog in public places. Various animal leashes and tethers which are resistant to sagging and tangling are known in the prior art, for example, there are leashes and tethers which are resistant to sagging and tangling for special purposes such as retractable leashes, standard leashes, restraint collar/harness, and tangle resistant leashes made of stiffened materials. Retractable leashes allow the dog a larger area to roam extending and retracting the leash out of and into the hand held unit adjusting for the distance between the dog and owner. One disadvantage to this approach is that the dog may spin or quickly return toward the owner stepping over the leash entangling the leash in the dog's front legs. Another approach is to utilize a standard flexible leash with a collar, restraint collar, or harness to walk a dog in public places. One disadvantage of this approach is that dog may spin and step over the leash entangling the leash in the dog's front legs causing the owner to have to feed the leash back between the dog's legs to untangle the leash. Another approach is to utilize tangle resistant leashes which are typically made of stiffer materials to prevent the leash from sagging or dragging on the ground. One disadvantage of this approach is that these leashes do not adjust or flex enabling the dog some degree of freedom in their position relative to the owner or walker.

Therefore, it is readily apparent that there is a recognizable unmet need for a dog leash detangle apparatus and methods of use, wherein a dog leash detangle apparatus may be configured to securely affix the leash and animal collar, more specifically, a dog leash detangle apparatus that is easily attached to the leash and easy to install between a leash and collar and thereby prevents sagging and tangling of the leash in the dog's front legs.

BRIEF SUMMARY

Briefly described, in example embodiment, the present apparatus overcomes the above-mentioned disadvantage, and meets the recognized need for a leash detangle apparatus and methods of use comprising, in general, a curved strip having a slot on one end configured to receive a ring from an animal collar, the strip having an aperture positioned at an opposite end, the aperture configured to receive an animal leash and clasp, wherein the clasp is affixed to the ring positioned through the slot and, thus, functions to enable the leash detangle apparatus to affix the leash and animal collar and maintain the leash in a position not between the animal's feet.

According to its major aspects and broadly stated, the detangle apparatus and methods of use comprising, in general, a dog leash detangle apparatus and methods of use comprising, in general, a curved strip having a slot on one end configured to receive a ring from an animal collar, the strip having an aperture positioned at an opposite end, the aperture configured to receive an animal leash and clasp, wherein the clasp is affixed to the ring positioned through the slot and a pair of guide tabs positioned proximate the slot, the pair of guide tabs configured to hold the ring from an animal collar in the slot.

In a preferred embodiment, an apparatus for engagement between a leash having a clasp and a collar for an animal having a ring attached thereto, the apparatus includes a curved strip having a slot positioned proximate a first end, the slot configured to receive therethrough the ring of the collar, the curved strip having an aperture positioned proximate a second end, the aperture configured to receive therethrough the leash having the clasp, wherein the clasp is affixed to the ring positioned therethrough the slot.

In a further exemplary embodiment, an assembly to prevent a leash from being entangled therein the front leg and paw of an animal, the assembly includes a leash having a clasp positioned proximate a first end, a collar having a ring positioned thereto, a curve d strip having a slot positioned proximate a first end, the slot configured to receive therethrough the ring of the collar, the curved strip having an aperture positioned proximate a second end, the aperture configured to receive therethrough the leash and the clasp, wherein the clasp is affixed to the ring positioned therethrough the slot.

In still a further exemplary embodiment of the method of preventing a loose end of a leash, affixed to a collar, from being entangled therein the front leg and paw of an animal, including the steps of providing a leash detangle apparatus, comprising curved strip having a slot positioned proximate a first end, and the curved strip having an aperture positioned proximate a second end, the aperture configured to receive therethrough a leash having a clasp, wherein the clasp is affixed to the ring positioned therethrough the slot, inserting the leash and the clasp therethrough the aperture, inserting the ring of the collar therethrough the slot, positioning the clasp proximate the ring of the collar, clasping the clasp thereto the ring to affix the leash, and detangle apparatus thereto the collar.

Accordingly, a feature of the leash detangle apparatus and methods of use is its ability to utilize existing animal collar and leash devices.

Another feature of the leash detangle apparatus and methods of use is its ability to prevent constant tension on the animal as happens with retractable leashes.

Still another feature of the leash detangle apparatus and methods of use is its ability to provide an animal control solution that fits around the neck rather than a body harness since a trainer maintains better animal control when controlling the animal's head.

Yet another feature of the leash detangle apparatus and methods of use is its ability to hold the leash up and away from the animals legs and feet preventing the leash from tangling around the animals front legs and feet.

Yet another feature of the leash detangle apparatus and methods of use is its ability to be easily attached and easy to install to an existing collar and leash.

Yet another feature of the leash detangle apparatus and methods of use is its ability to provide neat or hidden appearance of the apparatus.

Yet another feature of the leash detangle apparatus and methods of use is its ability to provide a versatile apparatus capable of integrating with a variety of collars and leash devices.

Yet another feature the leash detangle apparatus and methods of use is its ability to provide a single component apparatus that does not require any tools to assembly or for installation.

Yet another feature of the leash detangle apparatus and methods of use is its ability to accommodate different configuration of clasp.

Yet another feature of the leash detangle apparatus and methods of use is its ability to enable quick installation.

These and other features of the leash detangle apparatus and methods of use will become more apparent to one skilled in the art from the following Detailed Description of the Embodiments and Claims when read in light of the accompanying drawing Figures.

BRIEF DESCRIPTION OF THE DRAWINGS

The present leash detangle apparatus and methods of use will be better understood by reading the Detailed Description of the embodiments with reference to the accompanying drawing figures, in which like reference numerals denote similar structure and refer to like elements throughout, and in which.

Figure 1:
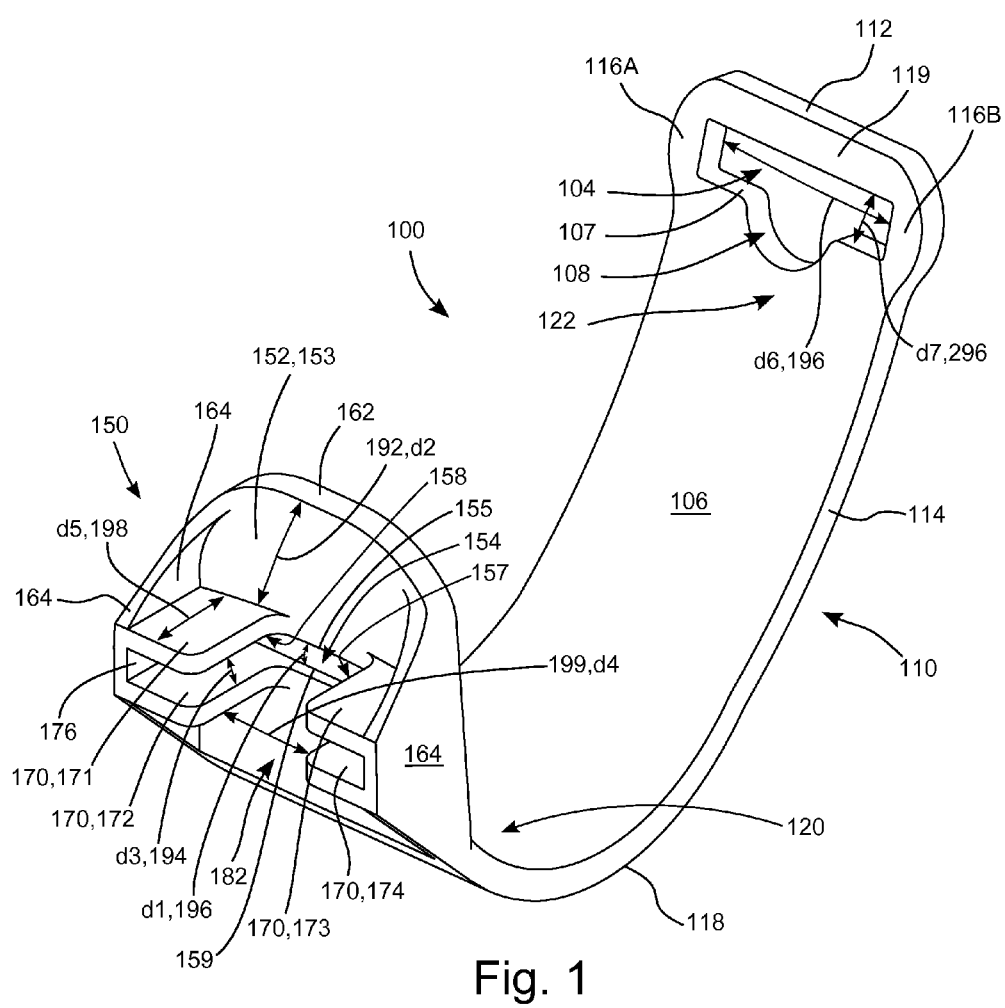
FIG. 1 is a perspective view of an example embodiment of the leash detangle apparatus.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-6 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-6 by way of example, and not limitation, therein is illustrated an example embodiment leash detangle apparatus 100, wherein leash detangle apparatus 100 includes strip 110 having top surface 106, bottom surface 153, side 114, edge 118, first end 120 and second end 122. Preferably, first end 120 includes slot 154 and second end 122 includes aperture 104. It is contemplated herein that leash detangle apparatus 100 may be utilized in conjunction with or integrated with a collar C having a ring R and leash L having a clasp CP positioned on one end, and thus to restrain and/or control the motion and direction of an animal, such as a dog D.

Referring now to FIG. 1, by way of example, and not limitation, there is illustrated leash detangle apparatus 100. Preferably, leash detangle apparatus 100 includes a shaped band or strap, such as strip 110. In this embodiment, strip 110 is preferably formed in a curved, contoured or bent configuration. Preferably strip 110 includes generally first end 120 and second end 122. First end 120 of strip 110 preferably includes base member 150, wherein base member 150 includes slot 154 positioned centrally therein base member 150 and proximate first end 120 of strip 110. In this embodiment, slot 154 preferably has a width shown as distance d1 represented by arrow 196, wherein slot 154 is preferably configured and sized, such as oval or rectangular shaped or the like, to accommodate, receive, the insertion therein of ring R of animal restraint collar C. Preferably base member 150 is configured with side support 164, which extends therefrom edge 118 and bottom surface 153 of strip 110, and configured to brace, support, or hold strip 110 in its shaped position and/or to brace, support, or hold pairs of guide tab 170. Moreover, strip 110 preferably continues past or extends beyond slot 154 to form upper lip 152. In this embodiment, upper lip 152 preferably extends a distance d2 represented by arrow 192 from slot 154 and configured as a fulcrum or lever between strip 110 and collar C. Preferably upper lip 152 includes a shaped or contoured end, such as curved end 162 configured to contact animal restraint collar C. In addition, first end 120 of strip 110 and/or side support 164 of base member 150 preferably includes guide tab 170 positioned proximate slot 154, which extends from bottom surface 153 and/or side support 164, and wherein guide tab 170 is configured to brace, support, or hold ring R of animal restraint collar C, and guide tab 170 is preferably configured to extend perpendicular to bottom surface 153. In this embodiment, first end 120 of strip 110 and/or side support 164 of base member 150 preferably includes pairs of guide tab 170, such as first pair of guide tabs, upper guide tab 173 disposed proximate upper edge 155 of slot 154 and lower guide tab 174 disposed proximate lower edge 159 of slot 154, and both upper guide tab 173 and lower guide tab 174 further positioned on first side 157 of slot 154 and/or such as second pair of guide tabs, upper guide tab 171 disposed proximate upper edge 155 of slot 154 and lower guide tab 172 disposed proximate lower edge 159 of slot 154, and both upper guide tab 171 and lower guide tab 172 further positioned on second side 158 of slot 154. In this embodiment, pairs of guide tab 170, such as upper guide tab 173, lower guide tab 174 (such as first pair of guide tab) and upper guide tab 171, lower guide tab 172 (such as second pair of guide tabs) are preferably configured to support ring R of animal restraint collar C therein slot 154. Moreover, pairs of guide tab 170, such as upper guide tab 173, lower guide tab 174 and upper guide tab 171, guide lower tab 172 are preferably spaced apart a width shown as distance d3 represented by arrow 194 to accommodate the insertion therein of ring R of animal restraint collar C. Furthermore, pairs of guide tab 170, such as such as upper guide tab 173, lower guide tab 174 and upper guide tab 171, lower guide tab 172 preferably extend a distance d5 represented by arrow 198 from bottom surface 153 to support ring R of animal restraint collar C therein slot 154. Still furthermore, guide tab 170, such as upper guide tab 171, upper guide tab 173 and lower guide tab 172, lower guide tab 174 are preferably spaced apart a width shown as distance d4 represented by arrow 199 to enable access to ring R of animal restraint collar C positioned therein and form gap 182 between upper guide tab 171, upper guide tab 173 and between lower guide tab 172, lower guide tab 174. In this embodiment, gap 182 is preferably sized and configured to receive clasp CP of leash L therein.

Leash detangle apparatus 100 is preferably formed of a suitable material, such as plastic, nylon, rubber, wood, steel, iron, rigid plastic or plastic with metal inserts for strength, fiber, metal, aluminum, alloy, stainless steel, or the like, capable of providing structure to leash detangle apparatus 100. Preferably, the material includes other suitable characteristics, such as durability, rust-resistance, light weight, heat-resistance, chemical inertness, oxidation resistance, stain resistance, ease of workability, or other beneficial characteristic understood by one skilled in the art.

Second end 122 of strip 110 preferably includes aperture 104 positioned centrally therein strip 110 and proximate second end 122 of strip 110. In this embodiment, aperture 104 preferably has a width shown as distance d6 represented by arrow 196 and height shown as distance d7 represented by arrow 296, wherein aperture 104 is preferably configured and sized, such as oval or rectangular shaped or the like, to accommodate, receive, the insertion therein of leash L. Moreover, aperture 104 preferably includes additional contoured, notched, or curved cutout 108 positioned proximate first edge 107, sized and configured to accommodate, receive, the insertion therein of clasp CP of leash L therein. It is contemplated herein that aperture 104 is configured and sized to enable clasp CP to pass therethrough aperture 104 and to hold or confine and enable leash L to slide therein aperture 104.

Figure 2:
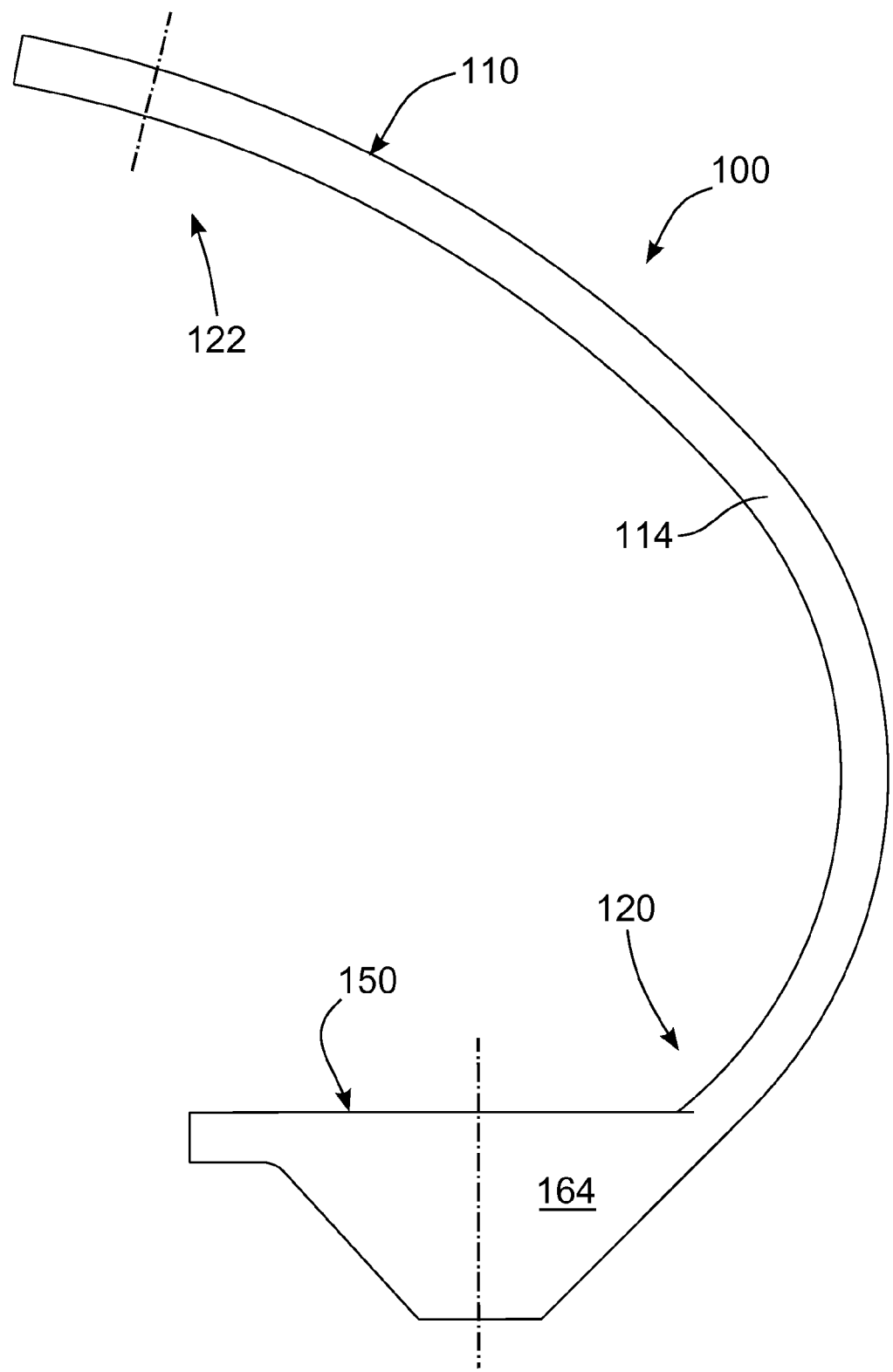
FIG. 2 is a side view of the leash detangle apparatus of FIG. 1.

Referring now to FIG. 2, by way of example, and not limitation, there is illustrated a side view of leash detangle apparatus 100. Preferably, leash detangle apparatus 100 includes base member 150 positioned proximate first end 120 of strip 110 and illustrates integral curved, arced or angular section of second end 122 of strip 110. Specifically, leash detangle apparatus 100 preferably includes stamped, shaped, bent or formed sections including strip 110 and base member 150 formed with apertures therein, such as aperture 104 and slot 154.

Figure 3:
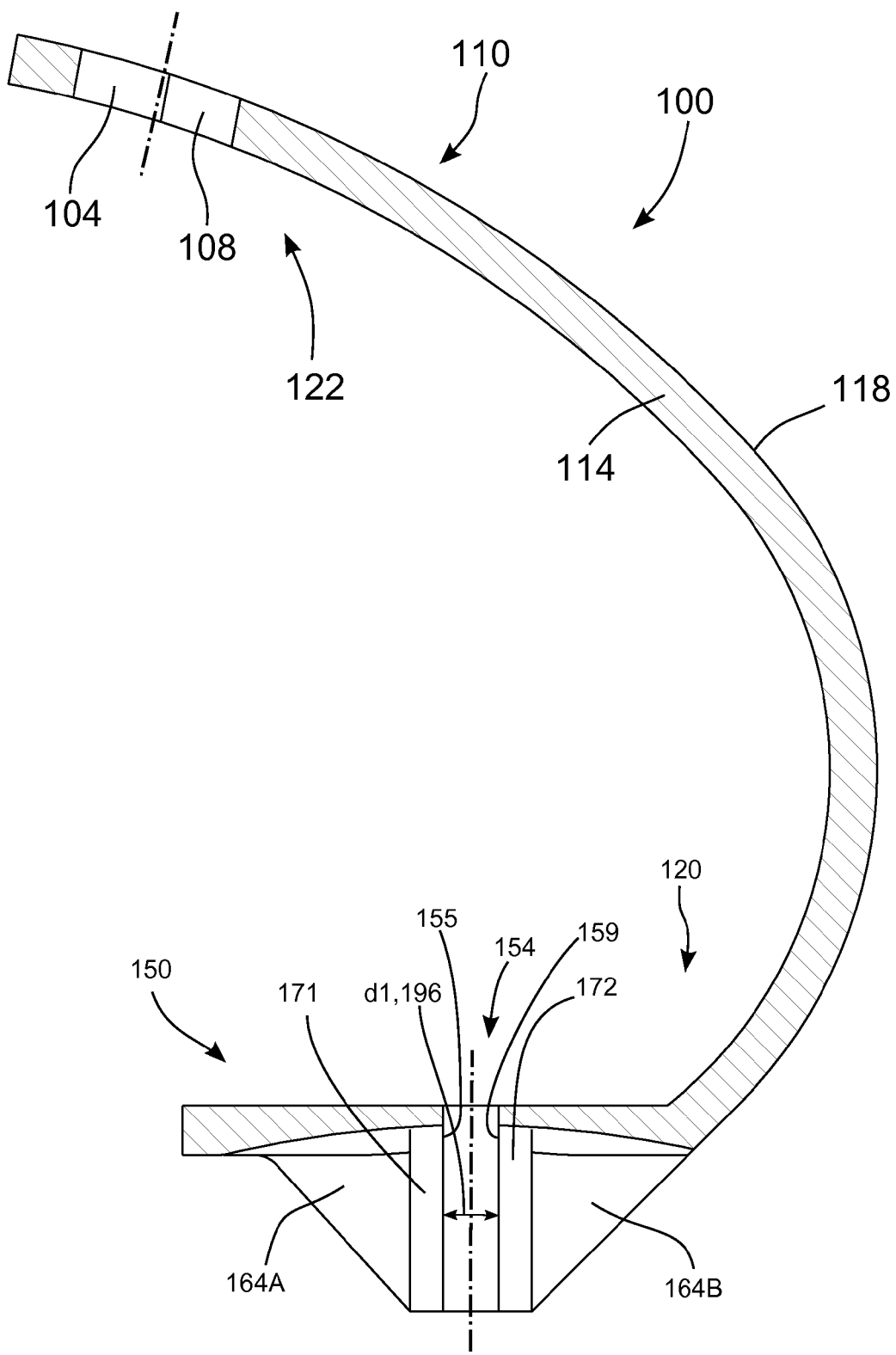
FIG. 3 is a side cross sectional view of the leash detangle apparatus of FIG. 1.

Referring now to FIG. 3, by way of example, and not limitation, there is illustrated a cross-sectional side view of leash detangle apparatus 100. Preferably, leash detangle apparatus 100 includes base member 150 positioned proximate first end 120 of strip 110 and illustrates integral curved, arced, or angular section of second end 122 of strip 110, wherein second end 122 includes aperture 104 and contoured or curved or the like cutout 108. Moreover, first side support 164A and second side support 164B extend from edge 118 of side 114 to brace, support, or hold pairs of guide tab 170, such as or guide tab 171 disposed proximate upper edge 155 of slot 154 and guide tab 172 disposed proximate lower edge 159 of slot 154 and wherein slot 154 preferably has a width shown as distance d1 represented by arrow 196.

Figure 4:
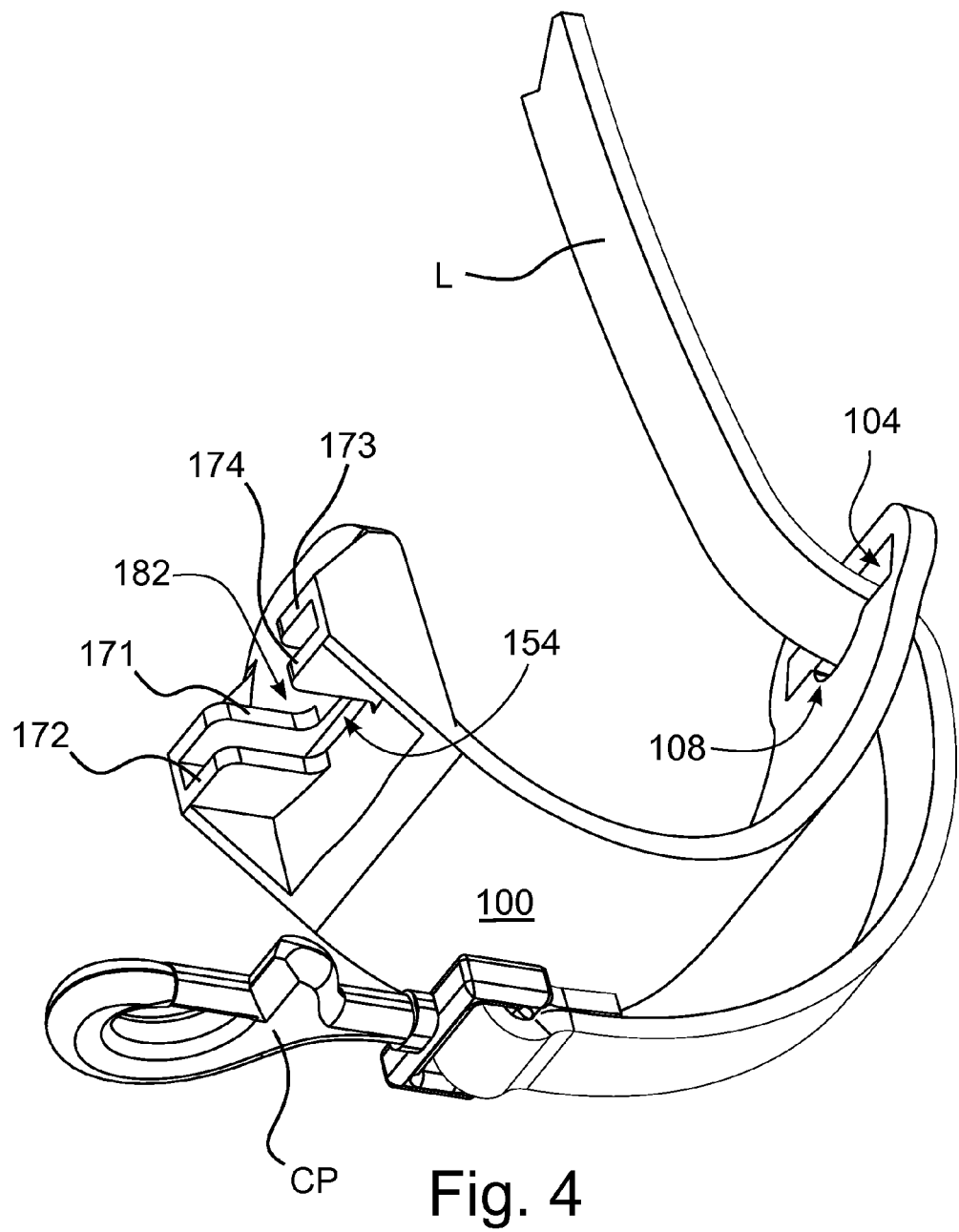
FIG. 4 is perspective view of the leash detangle apparatus of FIG. 1 shown integrated with the animal leash inserted therethrough an aperture of the leash detangle apparatus.

Referring now to FIG. 4, by way of example, and not limitation, there is illustrated a side perspective view of leash detangle apparatus 100 having leash L and clasp CP positioned on first end of leash L and positioned therethrough aperture 104, wherein leash L is positioned proximate curved, arced or angular section of second end 122 of strip 110, and wherein clasp CP is positioned proximate gap 182 positioned therebetween pairs of guide tab 170, such as upper guide tab 173, lower guide tab 174 and upper guide tab 171, lower guide tab 172. It is contemplated herein that aperture 104 may be sized and configured to accommodate a variety of leash L and clasp CP configurations.

Figure 5:
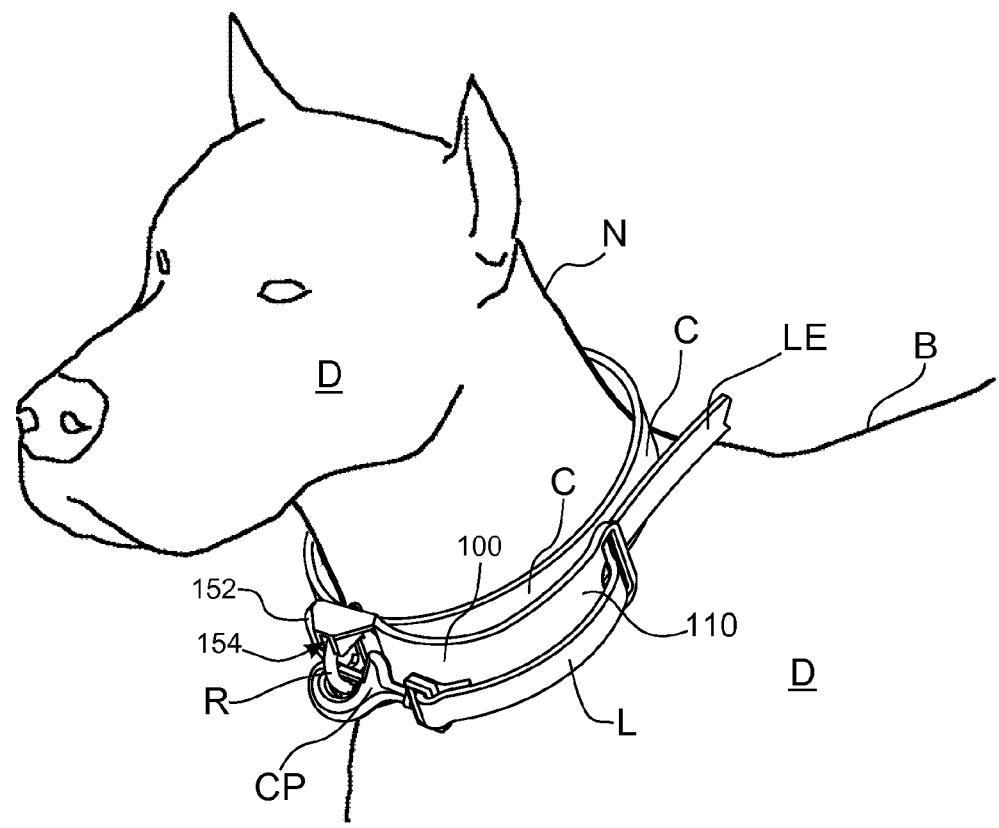
FIG. 5 is perspective view of the leash detangle apparatus of FIG. 1, integrated with the animal leash shown in FIG. 4, and affixed to the ring of the animal's collar.

Referring now to FIG. 5, by way of example, and not limitation, there is illustrated a side perspective view of leash detangle apparatus 100 positioned proximate collar C which is affixed to an animal, such as dog D, wherein ring R of animal restraint collar C is preferably positioned therethrough slot 154 and therebetween pairs of guide tab 170 to support ring R in gap 182, shown in FIG. 4. In use, clasp CP is preferably utilized to engage or hook ring R to affix leash detangle apparatus 100 thereto collar C. Moreover, strip 110 is preferably curved, arced or angled to traverse proximate animal restraint collar C and maintain leash L in an adjacent position thereto collar C. In use, upper lip 152 preferably extends a distance d2 represented by arrow 192 (shown in FIG. 1) from slot 154 to preferably contact animal restraint collar C to maintain strip 110 proximate animal restraint collar C and, thus to position loose end LE of leash L in a direction behind neck N of dog D toward the back B of dog D. In this position leash L is held in a position above the front leg and paw of dog D to prevent loose end LE of leash L from being entangled therein the front leg and paw of dog D.

It is contemplated herein that slot 154 and/or guide tab 170 may be sized and ring R of animal restraint collar C configurations. Moreover, leash detangle apparatus 100 preferably is re-useable, in that leash detangle apparatus 100 may be repeatedly affixed to any one of one or more sizes and configurations of animal restraint collar C and utilized to support loose end LE of leash L and to prevent loose end LE of leash L from being entangled therein the front leg and paw of dog D. It is contemplated herein that leash detangle apparatus 100 may be configured and/or sized to fit one of one or more sizes and configurations of animal restraint collar C.

Figure 6:
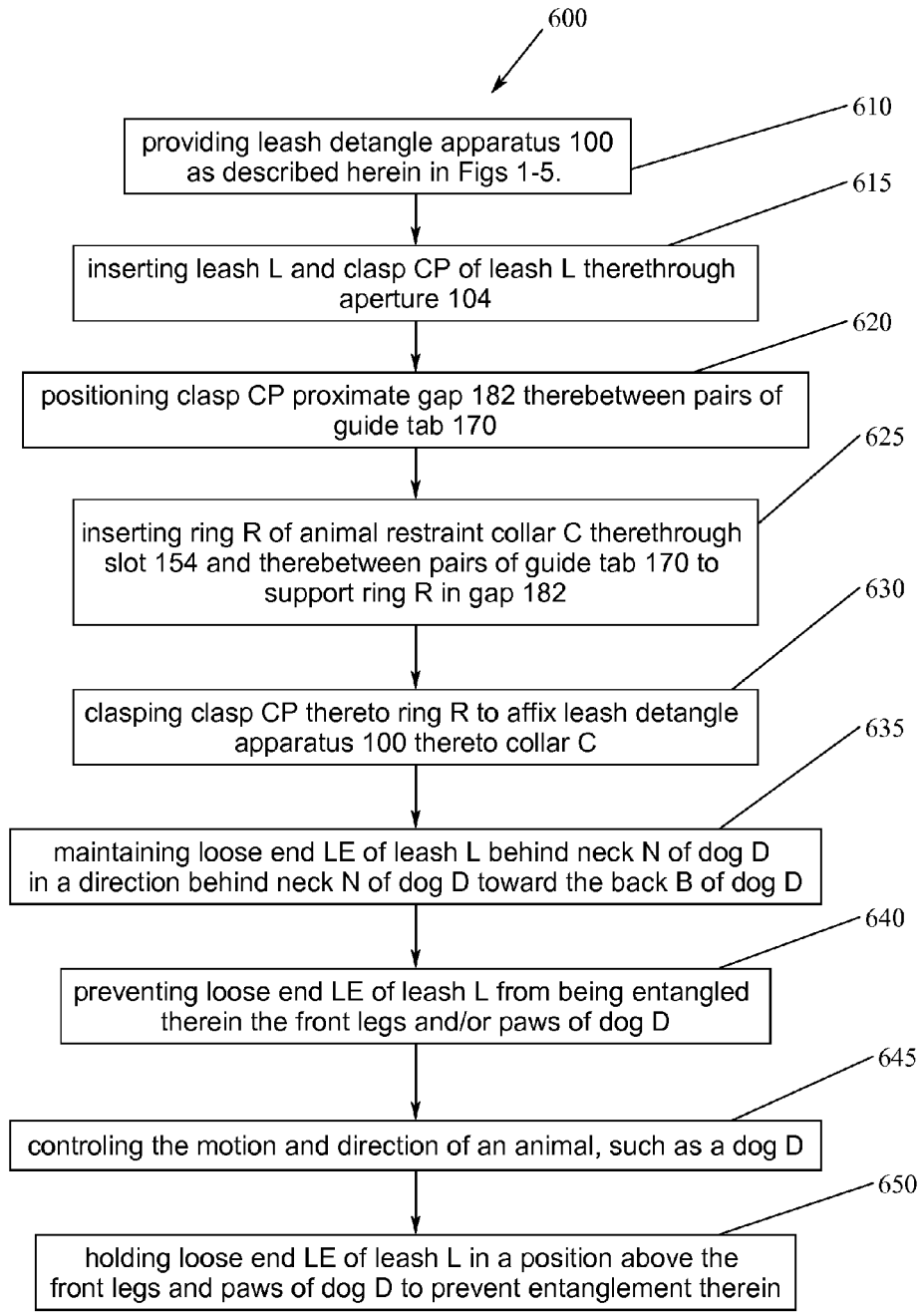
FIG. 6 is a flow diagram of a method of securing and utilizing the leash detangle apparatus of FIG. 1, integrated with the animal leash shown in FIG. 4, and affixed to the ring of the animal's collar.

Referring now to FIG. 6, there is illustrated a flow diagram 600 of a method for preventing a loose end LE of leash L, affixed to an animal restraint collar C, from being entangled therein the front leg and paw of dog D. In block or step 610, providing leash detangle apparatus 100, which comprises strip 110 having top surface 106, bottom surface 153, side 114, edge 118, first end 120 and second end 122, wherein first end 120 includes slot 154 and second end 122 includes aperture 104 as described above in FIGS. 1-5. In block or step 615, inserting leash L and clasp CP of leash L therethrough aperture 104, wherein leash L is positioned proximate curved, arced or angular section of second end 122 of strip 110. In block or step 620, positioning clasp CP proximate gap 182 therebetween pairs of guide tab 170. In block or step 625, inserting ring R of animal restraint collar C therethrough slot 154 and therebetween pairs of guide tab 170 to support ring R in gap 182. In block or step 630, clasping clasp CP thereto ring R to affix leash detangle apparatus 100 thereto collar C. In block or step 635, maintaining loose end LE of leash L behind neck N of dog D in a direction behind neck N of dog D toward the back B of dog D. In block or step 640, preventing loose end LE of leash L from being entangled therein the front leg and/or paw of dog D. In block or step 645, controlling the motion and direction of an animal, such as a dog D. In block or step 650, holding loose end LE of leash L in a position above the front leg and paw of dog D to prevent loose end LE of leash L from being entangled therein the front leg and paw of dog D.

The foregoing description and drawings comprise illustrative embodiments of the present invention. Having thus described exemplary embodiments, it should be noted by those ordinarily skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one ordinarily skilled in the art to which this invention pertains having the benefit of the teachings presented in the foregoing descriptions and the associated drawings. Although specific terms may be employed herein, they are used in a generic and descriptive sense only and not for purposes of limitation. Moreover, the present invention has been described in detail; it should be understood that various changes, substitutions and alterations can be made thereto without departing from the spirit and scope of the invention as defined by the appended claims. Accordingly, the present invention is not limited to the specific embodiments illustrated herein, but is limited only by the following claims.

What is claimed is:

1. An apparatus for engagement between a leash having a clasp and a collar for an animal having a ring attached thereto, the apparatus comprising:
    a curved strip having a slot positioned proximate a first end of said curved strip, said slot configured to receive therethrough the ring of the collar, said curved strip having an aperture positioned proximate a second end of said curved strip, said aperture configured to receive therethrough the leash having the clasp, wherein the clasp is affixed to the ring positioned therethrough said slot.

2. The apparatus of claim 1, wherein said curved strip further comprises a pair of guide tabs positioned proximate said slot, said pair of guide tabs configured to hold the ring of the collar in said slot.

3. The apparatus of claim 1, wherein said curved strip further comprises an upper lip positioned adjacent said slot, said upper lip configured as a fulcrum between said strip and the collar.

4. The apparatus of claim 3, wherein said upper lip further comprises a curved end configured to contact the collar to maintain said strip proximate the collar.

5. The apparatus of claim 2, wherein said curved strip further comprises a base member proximate said first end, wherein said slot is centrally positioned therein said base member.

6. The apparatus of claim 1, wherein said slot is rectangular shaped.

7. The apparatus of claim 5, wherein said base member further comprises a side support configured to extend therefrom an edge of said strip, and said side support configured to brace said pair of guide tabs.

8. The apparatus of claim 2, wherein said pair of guide tabs positioned proximate said slot further comprises an upper guide tab disposed proximate an upper edge of said slot and a lower guide tab disposed proximate a lower edge of said slot.

9. The apparatus of claim 8, wherein said pair of guide tabs further comprises a first pair of guide tabs and a second pair of guide tabs.

10. The apparatus of claim 9, wherein said first pair of guide tabs positioned on a first side of said slot and said second pair of guide tabs positioned on a second side of said slot.

11. The apparatus of claim 10, wherein said first pair of guide tabs and said second pair of guide tabs are configured form a gap therebetween.

12. The apparatus of claim 11, wherein said gap is configured to receive the clasp therein.

13. The apparatus of claim 11, wherein said aperture is centrally positioned therein said second end.

14. The apparatus of claim 13, wherein said aperture is rectangular shaped.

15. The apparatus of claim 11, wherein said strip is configured to traverse proximate the collar and maintain the leash in an adjacent position thereto the collar.

16. The apparatus of claim 14, wherein said aperture further comprises a cutout positioned proximate a first edge of said aperture and configured to pass the clasp therethrough said aperture.

17. The apparatus of claim 4, wherein said upper lip is configured to position a loose end of the leash in a direction behind a neck of the animal.

18. An assembly to limit entanglement therein with a front leg of an animal, the assembly comprising:
    a leash having a clasp positioned proximate a first end of said leash;
    a collar having a ring positioned thereto;
    a curved strip having a slot positioned proximate a first end of said curved strip, said slot configured to receive therethrough said ring of said collar, said curved strip having an aperture positioned proximate a second end of said curved strip, said aperture configured to receive therethrough said leash and said clasp, wherein said clasp is affixed to said ring positioned therethrough said slot.

19. The assembly of claim 18, wherein said curved strip further comprises a pair of guide tabs positioned proximate said slot, said pair of guide tabs configured to hold said ring in said slot.

20. The assembly of claim 18, wherein said curved strip further comprises an upper lip positioned adjacent said slot, said upper lip configured as a fulcrum between said strip and said collar.

21. The assembly of claim 20, wherein said upper lip further comprises a curved end configured to contact said collar to maintain said strip proximate said collar.

22. The assembly of claim 21, wherein said strip is configured to traverse proximate said collar and maintain said leash in an adjacent position thereto said collar.

23. The assembly of claim 22, wherein said upper lip is configured to position a loose end of said leash in a direction behind a neck of the animal.

* * * * *